United States Patent
Tian et al.

(10) Patent No.: US 11,582,137 B1
(45) Date of Patent: Feb. 14, 2023

(54) SYSTEMS AND METHODS FOR EXTENDING APPLICATION-AWARE ROUTING TO IMPROVE SITE ENCRYPTION THROUGHPUT PERFORMANCE

(71) Applicant: Cisco Technology, Inc., San Jose, CA (US)

(72) Inventors: Lei Tian, Manhasset, NY (US); Zaheer Aziz, Murphy, TX (US); Azharuddin Mohammed, Irving, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/586,955

(22) Filed: Jan. 28, 2022

(51) Int. Cl.
*H04L 45/02* (2022.01)
*H04L 12/46* (2006.01)
*H04L 45/12* (2022.01)
*H04L 45/42* (2022.01)

(52) U.S. Cl.
CPC .......... *H04L 45/02* (2013.01); *H04L 12/4641* (2013.01); *H04L 45/124* (2013.01); *H04L 45/42* (2013.01)

(58) Field of Classification Search
CPC ... H04L 45/02; H04L 12/4641; H04L 45/124; H04L 45/42
USPC ....................................................... 709/238
See application file for complete search history.

(56) References Cited

U.S. PATENT DOCUMENTS

| | | | |
|---|---|---|---|
| 9,641,403 B2 * | 5/2017 | Lehane | H04L 41/5019 |
| 10,581,960 B2 * | 3/2020 | Gunda | G06F 9/5077 |
| 10,848,514 B2 * | 11/2020 | Christian | G06N 99/00 |
| 10,887,330 B2 * | 1/2021 | Christian | G06K 9/6218 |
| 10,958,613 B2 * | 3/2021 | Gil | G06N 20/00 |
| 2015/0281408 A1 * | 10/2015 | Kwan | H04L 63/0227 370/474 |
| 2015/0334090 A1 * | 11/2015 | Ling | H04L 63/1408 726/13 |
| 2016/0072669 A1 | 3/2016 | Saavedra | |
| 2016/0119330 A1 | 4/2016 | L'Heureux et al. | |
| 2020/0127905 A1 | 4/2020 | Mayya et al. | |
| 2020/0389796 A1 | 12/2020 | Olofsson et al. | |
| 2021/0112034 A1 | 4/2021 | Sundararajan et al. | |

* cited by examiner

*Primary Examiner* — Anthony Mejia
(74) *Attorney, Agent, or Firm* — Baker Botts L.L.P.

(57) ABSTRACT

In one embodiment, a method includes establishing, by an identity agent installed on a device, a connection to a browser installed on the device and generating, by the identity agent, first device information, a public key, and a private key. The method also includes communicating, by the identity agent, the first device information and the public key to an authentication service and receiving, by the identity agent, a unique identifier from the authentication service. The method further includes generating, by the identity agent, a first signature of the first device information and communicating, by the identity agent, the first signature, the first device information, and the unique identifier to the browser.

20 Claims, 2 Drawing Sheets

SYSTEMS AND METHODS FOR EXTENDING APPLICATION-AWARE ROUTING TO IMPROVE SITE ENCRYPTION THROUGHPUT PERFORMANCE

TECHNICAL FIELD

The present disclosure relates generally to communication networks, and more specifically to systems and methods for extending Application-Aware Routing (AAR) to improve site encryption throughput performance.

BACKGROUND

AAR provides Service Level Agreement (SLA) based routing for applications such as business-critical applications. AAR directs application traffic to wide area network (WAN) links that support the required levels for latency, jitter, and packet loss as defined in an application's SLA. Certain network nodes have an integrated deep packet inspection (DPI) engine that identifies and classifies applications (e.g., voice, video, email, file sharing, gaming, peer-to-peer (P2P), and/or cloud-based applications). However, for DPI to be effective, traffic symmetry (e.g., traffic flowing into and out from the same device) is required.

DESCRIPTION OF EXAMPLE EMBODIMENTS

Overview

Figure 1:
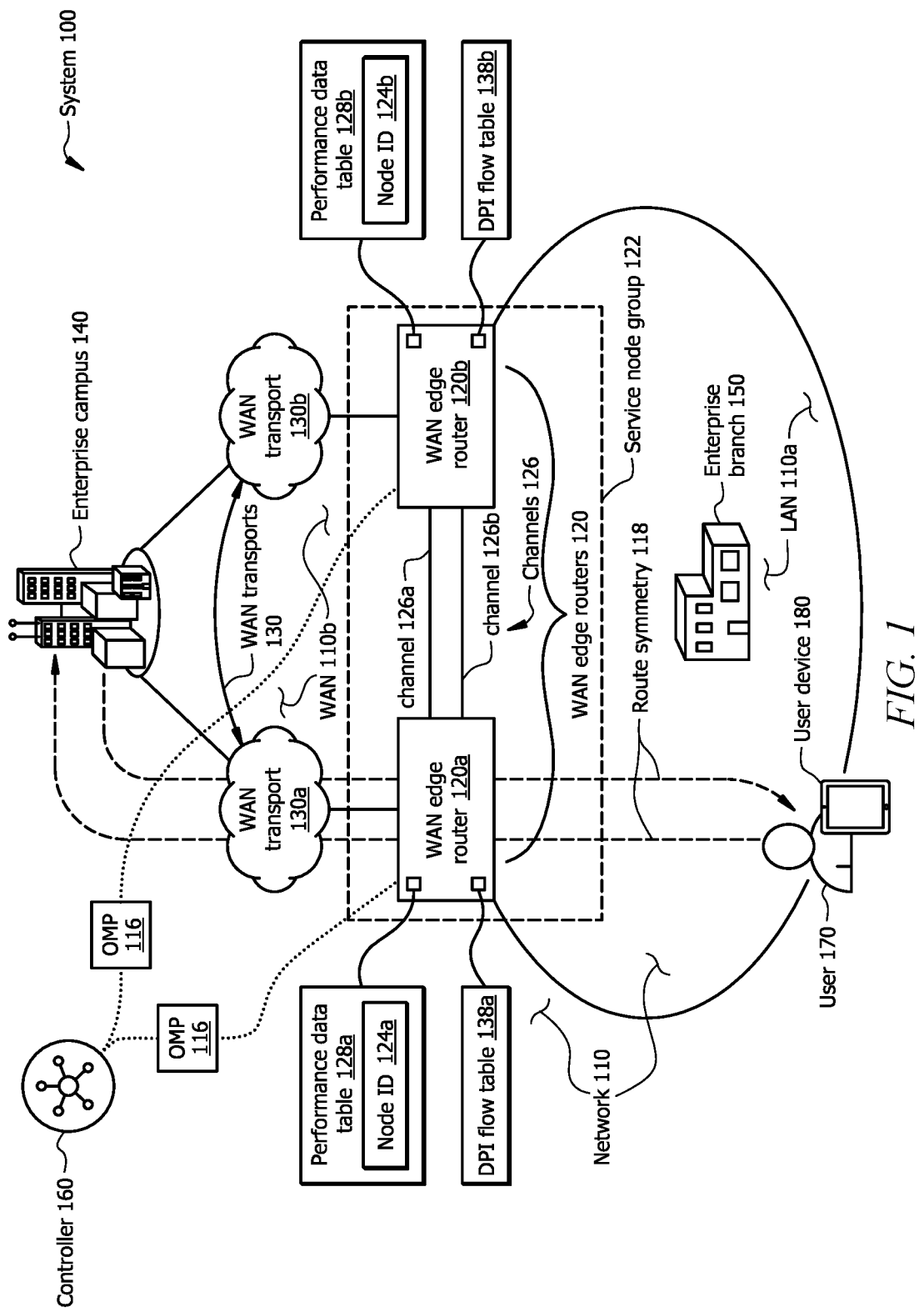
FIG. 1 illustrates an example system that uses an AAR extension to improve site encryption throughput performance.

According to an embodiment, a network node includes one or more processors and one or more computer-readable non-transitory storage media coupled to the one or more processors and including instructions that, when executed by the one or more processors, cause the network node to perform operations. The operations include defining a service node group that includes the first network node and a second network node. The first network node includes a first performance data table and a first DPI flow table. The operations also include receiving a second performance data table and a second DPI flow table from the second network node, comparing the first performance data table and the second performance data table, and determining a routing decision for incoming traffic in response to comparing the first performance data table and the second performance data table.

In certain embodiments, the first network node and the second network node are WAN edge routers. In some embodiments, the network is a software-defined wide area network (SD-WAN). In certain embodiments, the first performance data table includes a first unique identifier assigned to the first network node. In some embodiments, the second performance data table includes a second unique identifier assigned to the second network node. The first network node and the second network node may be located at a same branch location.

In certain embodiments, the operations include assigning a dedicated data logical link per-service virtual private network (VPN) between the first network node and the second network node to forward traffic from the first network node to the second network node. In some embodiments, the operations include measuring a transport quality on one or more WAN edge links directly connected to the first network node and/or recording performance data in the first performance data table in response to measuring the transport quality on the one or more WAN edge links. In certain embodiments, the operations include generating a control channel between the first network node and the second network node of the service node group using a Network Configuration Protocol (NETCONF).

According to another embodiment, a method includes defining, by a first network node of a network, a service node group that includes the first network node and a second network node. The first network node includes a first performance data table and a first DPI flow table. The method also include receiving, by the first network node, a second performance data table and a second DPI flow table from the second network node, comparing, by the first network node, the first performance data table and the second performance data table, and determining, by the first network node, a routing decision for incoming traffic in response to comparing the first performance data table and the second performance data table.

According to yet another embodiment, one or more computer-readable non-transitory storage media embody instructions that, when executed by a processor, cause the processor to perform operations. The operations include defining a service node group that includes a first network node and a second network node. The first network node includes a first performance data table and a first DPI flow table. The operations also include receiving a second performance data table and a second DPI flow table from the second network node, comparing the first performance data table and the second performance data table, and determining a routing decision for incoming traffic in response to comparing the first performance data table and the second performance data table.

Technical advantages of certain embodiments of this disclosure may include one or more of the following. Certain embodiments of this disclosure distribute encryption and decryption processes across multiple network nodes (e.g., a first network node and a second network node). Increasing the total number of tunnels may be reduced and/or avoided by not using a Transport Locator (TLOC) extension. Site-level throughput may be increased by utilizing the multiple network nodes. Abstraction may be achieved of the application performance decision from local area network (LAN) to WAN. In certain embodiments, the complexity of LAN routing is reduced.

In certain embodiments, the path taken by application traffic through the network is optimized by directing the application traffic to WAN links that support the required levels of packet loss, latency, and jitter defined in an application's SLA. In the event of network brownouts or soft failures, performance degradation may be minimized. In some embodiments, the tracking of network and path conditions by AAR in real time quickly reveals performance issues and automatically activates strategies that redirect business critical data traffic to the best available paths that satisfy the SLA. As the network recovers from the brownout or soft failure conditions, AAR may automatically readjust the data traffic paths. In certain embodiments, network costs are reduced by more efficiently load-balancing the data traffic. In some embodiments, application performance is increased without the need for WAN upgrades.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods that use an AAR extension to improve site encryption throughput performance. SD-WAN AAR routes application traffic based on network performance against predefined SLAs for known application signatures leveraging DPI. DPI requires traffic symmetry (e.g., traffic flowing into and out from the same network node), which prevents an SD-WAN site from utilizing all available WAN edge devices. As such, aggregated SD-WAN site throughput may be limited to a single WAN edge device.

A symmetrical traffic flow and DPI can be achieved by dual-homing WAN circuits with a single WAN edge device as the preferred WAN edge device. However, this approach limits an aggregated SD-WAN site throughput to that single WAN Edge device. While a TLOC extension may be used to satisfy the WAN circuit dual-homed requirement, the TLOC extension increases the total number of tunnels in the system without guaranteeing symmetrical traffic flow. This disclosure extends AAR by allowing multiple WAN edge routers located at a same site to share tunnel performance, flow data, and other useful information over a channel locally at the site to make intelligent packet forwarding decisions. This AAR extension does not increase tunnels as in the TLOC extension feature.

FIG. 1 illustrates an example system 100 that uses an AAR extension to improve site encryption throughput performance. System 100 or portions thereof may be associated with an entity, which may include any entity, such as a business, company, or enterprise, that uses AAR. In certain embodiments, the entity may be a service provider that provides AAR services. The components of system 100 may include any suitable combination of hardware, firmware, and software. For example, the components of system 100 may use one or more elements of the computer system of FIG. 3. In the illustrated embodiment of FIG. 1, system 100 includes network 110, WAN edge routers 120, WAN transports 130, an enterprise campus 140, an enterprise branch 150, a controller 160, a user 170, and a user device 180.

Network 110 of system 100 is any type of network that facilitates communication between components of system 100. Network 110 may connect one or more components of system 100. One or more portions of network 110 may include an ad-hoc network, the Internet, an intranet, an extranet, a VPN, an Ethernet VPN (EVPN), a LAN, a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN. Network 110 of FIG. 1 includes LAN 110a and WAN 110b.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more WAN edge routers 120, WAN transports 130, controllers 160, user devices 180, and the like.

WAN edge routers 120 of system 100 are specialized routers that reside at an edge or a boundary of a network. In certain embodiments, WAN edge routers 120 use static and/or dynamic routing to send data to and/or receive data from WAN 110b of system 100. WAN edge routers 120 may include one or more hardware devices, one or more servers that include routing software, and the like. In the illustrated embodiment of FIG. 1, WAN edge routers 120 reside at the edge of LAN 110a. LAN 110a of system 100 is associated with enterprise branch 150. In certain embodiments, the infrastructure of LAN 110a provides connectivity to WAN edge routers 120 to access enterprise campus 140 through WAN 110b. In the illustrated embodiment of FIG. 1, WAN edge routers 120 include WAN edge router 120a and WAN edge router 120b.

In certain embodiments, one or more WAN edge routers 120 establish a node group 122. Node group 122 is a group of WAN edge routers 120 at a same site (e.g., enterprise branch 150) that will form connections (e.g., bi-directional control connections) between each other. In the illustrated embodiment of FIG. 1, node group 122 includes WAN edge router 120a and WAN edge router 120b.

In some embodiments, each WAN edge router 120 is associated with a node identifier (ID) 124. Node ID 124 is a unique identifier assigned to each WAN edge router 120. Each node ID 124 may be a numeric string, an alphanumeric string, or any other suitable identifier that is used to distinguish nodes of system 100. In certain embodiments, node IDs 124 are assigned to each WAN edge router 120 of node group 122 when node group 122 is created. In the illustrated embodiment of FIG. 1, node IDs 124 include node ID 124a and node ID 124b. Node ID 124a is assigned to WAN edge router 120a, and node ID 124b is assigned to WAN edge router 120b.

In certain embodiments, one or more channels 126 are formed between the nodes of node group 122. Channels 126 are links for communicating data between nodes of system 100. In the illustrated embodiment of FIG. 1, channels 126 are located between WAN edge router 120a and WAN edge router 120b of service node group 122. Channels 126 may be wired links that transport data through wires and cables or wireless links that transport data without the use of cables or wires.

Channels 126 may include control channels 126a and/or data channels 126b. For example, WAN edge router 120a may generate one or more control channels 126a between WAN edge router 120a and WAN edge router 120b of node group 122 using a protocol such as Network Configuration Protocol (NETCONF), Representational State Transfer Configuration Protocol (RESTCONF), Transmission Control Protocol (TCP), Simple Network Management Protocol (SNMP), a combination thereof, or the like. As another example, WAN edge router 120a may generate one or more data channels 126b between WAN edge router 120a and WAN edge router 120b of node group 122 using a VPN. In certain embodiments, each WAN edge router 120 includes a dedicated interface for control data replication in the transport VPN. In some embodiments, one or more data channels 126b are dedicated logical links per service VPN between members of node group 122 that are used for data forwarding. In certain embodiments, system 100 provides multiplexing of VPNs across data channel 126b.

Each WAN edge router 120 in node group 122 measures tunnel performance from connected WAN transports 130. The measurement results are stored on each WAN edge router 120 in performance data tables 128. Performance data tables 128 are representations of data associated with system 100 that assist nodes of system 100 in making forwarding decisions. Performance data tables 128 may present information in any suitable format. For example, performance data tables 128 may present information in rows and columns, symbols, bars, lines, slices, charts, etc. In the illustrated embodiment of FIG. 1, performance data tables 128 include first performance data table 128a, which is associated with WAN edge router 120a, and performance data table 128b, which is associated with WAN edge router 120b.

Performance data tables 128 may include tunnel performance data, flow data, and/or any other suitable information. In certain embodiments, performance data tables 128 include an application type (e.g., voice, video, media, business-critical, transactional, etc.), one or more SLA requirements (e.g., latency, jitter, loss), a circuit quality for transport, and the like. If the circuit quality for a particular transport fails to satisfy one or more associated SLA requirements, that particular transport may be removed from performance data table 128. The circuit quality may be determined by tunneling Bidirectional Forwarding Detection (BFD) packets between the source and the destination. The BFD packets may be sent in intervals. The information collected by the packets may be used to measure network parameters for determining the circuit quality for transport.

In the illustrated embodiment of FIG. 1, WAN edge router 120a stores performance data table 128a, and WAN edge router 120b stores a performance data table 128b. Performance data table 128a includes node ID 124a, and performance data table 128b includes node ID 124b. WAN edge routers 120 located at the same site (e.g., enterprise branch 150) may share tunnel performance, flow data, and other useful information provided in performance data tables 128 over one or more channels 126 locally at the site. In certain embodiments, performance data tables 128 are shared between the members of node group 122. For example, WAN edge router 120a may share performance data table 128a and/or performance data from performance data table 128a with WAN edge router 120b. As another example, WAN edge router 120b may share performance data table 128b and/or performance data from performance data table 128b with WAN edge router 120a. WAN edge routers 120 may use node IDs 124 to associate a particular performance data table 128 with a particular WAN edge router 120. In certain embodiments, the members of node group 122 exchange performance data tables 128 at a predetermined time interval. In some embodiments, the members of node group 122 exchange performance data tables 128 in response to one or more updates to performance data tables 128.

WAN transports 130 of system 100 are circuits that communicate packets from one edge router to another edge router. In the illustrated embodiment of FIG. 1, Wan transports 130 communicate packets from WAN edge routers 120 of enterprise branch 150 to one or more edge routers of enterprise campus 140. In certain embodiments, WAN transports 130 are only aware of routes to follow to reach the next-hop or destination router. WAN transports 130 may be unaware of the prefixes for non-transport routers (i.e., the routers that are located behind the transport routers in their local service networks). In the illustrated embodiment of FIG. 1, WAN transports 130 include WAN transport 130a and WAN transport 130b. WAN transport 130a provides a link from WAN edge router 120a of enterprise branch 150 to enterprise campus 140. WAN transport 130b provides a link from WAN edge router 120b of enterprise branch 150 to enterprise campus 140.

In some embodiments, WAN edge routers 120 compare the performance data in performance data tables 128 to make intelligent packet forwarding decisions. For example, WAN edge router 120a may compare the performance data in performance data table 128a with the performance data in performance data table 128b to determine whether to route the traffic through WAN transport 130a or WAN transport 130b. If the performance data comparison indicates that WAN transport 130a is preferred, then WAN edge router 120a routes traffic received from LAN 110a to WAN transport 130a. If the performance data comparison indicates that WAN transport 130b is preferred, then WAN edge router 120a routes traffic received from LAN 110a to WAN edge router 120b via data channel 126b. Upon receiving the traffic from WAN edge router 120a, WAN edge router 120b routes the traffic to WAN transport 130b.

One or more WAN edge routers 120 may have an integrated DPI engine to identify and/or classify applications including voice, video, email, file sharing, gaming, peer-to-peer (P2P), and/or cloud-based applications. In certain embodiments, one or more WAN edge routers 120 leverage Qosmos DPI to classify the traffic. In some embodiments, one or more WAN edge routers 120 use Network Based Application Recognition (NBAR) to identify a wide variety of applications from the network traffic flows. Typically, the DPI engine requires route symmetry 118 to correctly identify the traffic pattern. Route symmetry 118 occurs when packet streams between two endpoints follow the same set of links for forward and reverse directions. As illustrated in FIG. 1, route symmetry 118 occurs when packet streams flow from user device 180 through WAN edge router 120a through WAN transport 130a to enterprise campus 140, and then back along the same path from enterprise campus 140 through WAN transport 130a through WAN edge router 120a to user device 180.

In certain embodiments, WAN edge routers 120 store one or more DPI flow tables 138. DPI flow tables 138 identify the type of application. In certain embodiments, DPI flow tables 138 are used to verify that one or more WAN edge routers 120 can see bi-directional traffic. In some embodiments, one or more WAN edge routers 120 identify information (e.g., IP address, port number, domain name, server name, etc.) of a particular packet and store the information in DPI flow tables 138. In the illustrated embodiment of FIG. 1, WAN edge router 120a stores a DPI flow table 138a and WAN edge router 120b stores a DPI flow table 138b. In certain embodiments, nodes of node group 122 share DPI flow tables 138. For example, WAN edge router 120*a* may share DPI flow table 138*a* with WAN edge router 120*b*. As another example, WAN edge router 120*b* may share DPI flow table 138*b* with WAN edge router 120*a*. In certain embodiments, the members of node group 122 exchange DPI flow tables 138 at a predetermined time interval. In some embodiments, the members of node group 122 exchange DPI flow tables 138 in response to one or more updates to DPI flow tables 138.

In certain embodiments, a network administrator defines the desired SLA for the application traffic (e.g., business-critical application traffic). The SLA characteristics may include the desired loss, latency and/or jitter for the specified classified traffic. In certain embodiments, WAN edge routers 120 determine the path characteristics for WAN transports 130. The path characteristics may include loss, latency, and/or and jitter from probes (e.g., BFD probes) sent across each WAN transport 130. Packet loss may be calculated by one or more WAN edge routers 120 on a per tunnel basis. Packet loss may be measured as percentage 0 through 100 percent. Jitter may be calculated on one or more WAN Edge routers 120 on a per tunnel basis. Jitter may be a measurement of millisecond, 0 through 1000 milliseconds. Latency may be calculated on one or more WAN edge routers 120 on a per tunnel basis. Latency may be a measurement of millisecond, 0 through 1000 milliseconds.

In certain embodiments, one or more WAN edge routers 120 continuously probe one or more WAN transports 130 to perform path liveliness and/or measure the path characteristics with BFD packets. WAN transports 130 of system 100 are links used to communicate traffic within a WAN environment. WAN transports 130 may support MPLS, Internet, LTE, and the like. In the illustrated embodiment of FIG. 1, WAN transports 130 include WAN transport 130*a* and WAN transport 130*b*.

Enterprise campus 140 of system 100 is the part of an enterprise network infrastructure that provides network access to end users and devices located at the same geographical location. Enterprise campus 140 may span over several floors in a single building or over multiple buildings covering a larger geographical area. In the illustrated embodiment of FIG. 1, enterprise campus 140 connects to a network core that provides access to the other parts of network 110 such as LAN 110*a* of enterprise branch 150.

Enterprise branch 150 of system 100 is a part of the enterprise network infrastructure that provides users at a geographically disperse remote site access to the same network services as users in enterprise campus 140. Enterprise branch 150 and enterprise campus 140 may be established and maintained by the same business enterprise. In certain embodiments, enterprise branch 150 performs the same operations as enterprise campus 140.

Controller 160 of system 100 is a centralized controller that oversees the control plane of the SD-WAN fabric of network 110. In certain embodiments, controller 160 establishes, manages, provisions, maintains, and/or adjusts one or more connections of network 110. For example, controller 160 may control the flow of data traffic through one or more connections of network 110. In certain embodiments, controller 160 establishes and/or maintains a control plane connection with WAN edge router 120*a* and WAN edge router 120*b* of network 110. In some embodiments, controller 160 includes software that runs on one or more servers of system 100.

Overlay Management Protocol (OMP) 1160 is a routing protocol that may be used to exchange routing, policy, and/or management information between controller 160 and WAN edge routers 120 of system 100. In certain embodiments, OMP 116 runs inside Datagram Transport Layer Security (DTLS) control plane connections. OMP 116 may carry the routes, next hops, keys, and/or policy information needed to establish and/or maintain the overlay network of system 100. In the illustrated embodiment of FIG. 1, OMP 116 runs between controller 160 and WAN edge routers 120. In some embodiments, OMP 116 carries only control plane information.

In certain embodiments, controller 160 distributes an AAR policy through OMP 116 to the appropriate WAN edge router 120 in network 110. The AAR policy maps the service-side application(s) to specific SLA requirements. For example, the AAR policy may map the classified traffic to a particular WAN transport 130 based on the defined SLA requirement. In certain embodiments, the AAR policy includes match-action pairs. The match statement defines the application-list and/or the type of traffic to match, and the action statement defines the SLA action the WAN edge routers 120 must enforce for the specified traffic. WAN edge routers 120 may store one or more AAR policies in performance data tables 128.

User 170 of system 100 is a person or group of persons who utilizes user device 180 of system 100. User 170 may be associated with one or more accounts. User 170 may be a local user, a remote user, an administrator, a customer, a company, a combination thereof, and the like. User 170 may be associated with a username, a password, a user profile, etc. In certain embodiments, user 170 initiates the communication of one or more packets from user device 180 to one or more WAN edge routers 120 via LAN 110*a*

User device 180 of system 100 includes any user equipment that can receive, create, process, store, and/or communicate information. User device 180 may include one or more workstations, desktop computers, laptop computers, mobile phones (e.g., smartphones), tablets, personal digital assistants (PDAs), wearable devices, and the like. In certain embodiments, user device 180 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 180 may be located in any suitable location to receive and communicate information to user 170 of system 100. In the illustrated embodiment of FIG. 1, user device 180 is located at enterprise branch 150.

In operation, WAN edge router 120*a* of system 100 defines service node group 122, which includes WAN edge router 120*a* and WAN edge router 120*b* located at enterprise branch 150. A dedicated interface is used on each WAN Edge router 120 for control data replication in the transport VPN. WAN edge router 120*a* creates control channel 126*a* using NETCONF between WAN edge router 120*a* and WAN edge router 120*b* of service node group 122. WAN edge router 120*a* measures the quality of directly connected WAN transports 130*a* and records performance data related to the quality of WAN transports 130*a* in performance data table 128*a*. Similarly, WAN edge router 120*b* measures the quality of directly connected WAN transports 10*b* and records performance data related to the quality of WAN transports 130*b* in performance data table 128*b*. WAN edge router 120*a* and WAN edge router 120*b* of service node group 122 share performance data from performance data tables 128 and DPI flow data from DPI flow tables 138.

WAN edge router 120*a* receives a packet from user device 180 via LAN 110*a*. WAN edge router 120*a* performs a lookup in performance data table 128*a* and performance data table 128*b* and compares the performance data. Based on the comparison of the performance data in performance table 128*a* and performance table 128*b*, WAN edge router 120*a* determines that WAN transport 130*b* associated with WAN edge router 120*b* is preferred to WAN transport 130*a* associated with WAN edge router 120*a*. WAN edge router 120*a* routes the packet to WAN edge router 120*b* over data channel 126*b*. WAN edge router 120*b* communicates the packet to the overlay over WAN transport 130*b*. As such, by sharing tunnel performance, flow data, and other useful information over channels 126 locally at enterprise branch 150, WAN edge router 120*a* can make intelligent packet forwarding decisions without increasing the number of tunnels in system 100.

Although FIG. 1 illustrates a particular number of networks 110, WAN edge routers 120, WAN transports 130, enterprise campuses 140, enterprise branches 150, controllers 160, users 170, and user devices 180, this disclosure contemplates any suitable number of networks 110, WAN edge routers 120, WAN transports 130, enterprise campuses 140, enterprise branches 150, controllers 160, users 170, and user devices 180. For example, system 100 may include more than two WAN edge routers 120.

Although FIG. 1 illustrates a particular arrangement of network 110, WAN edge routers 120, WAN transports 130, enterprise campus 140, enterprise branch 150, controller 160, user 170, and user device 180, this disclosure contemplates any suitable arrangement of network 110, WAN edge routers 120, WAN transports 130, enterprise campus 140, enterprise branch 150, controller 160, user 170, and user device 180. Furthermore, although FIG. 1 describes and illustrates particular components, devices, or systems carrying out particular actions, this disclosure contemplates any suitable combination of any suitable components, devices, or systems carrying out any suitable actions.

Figure 2:
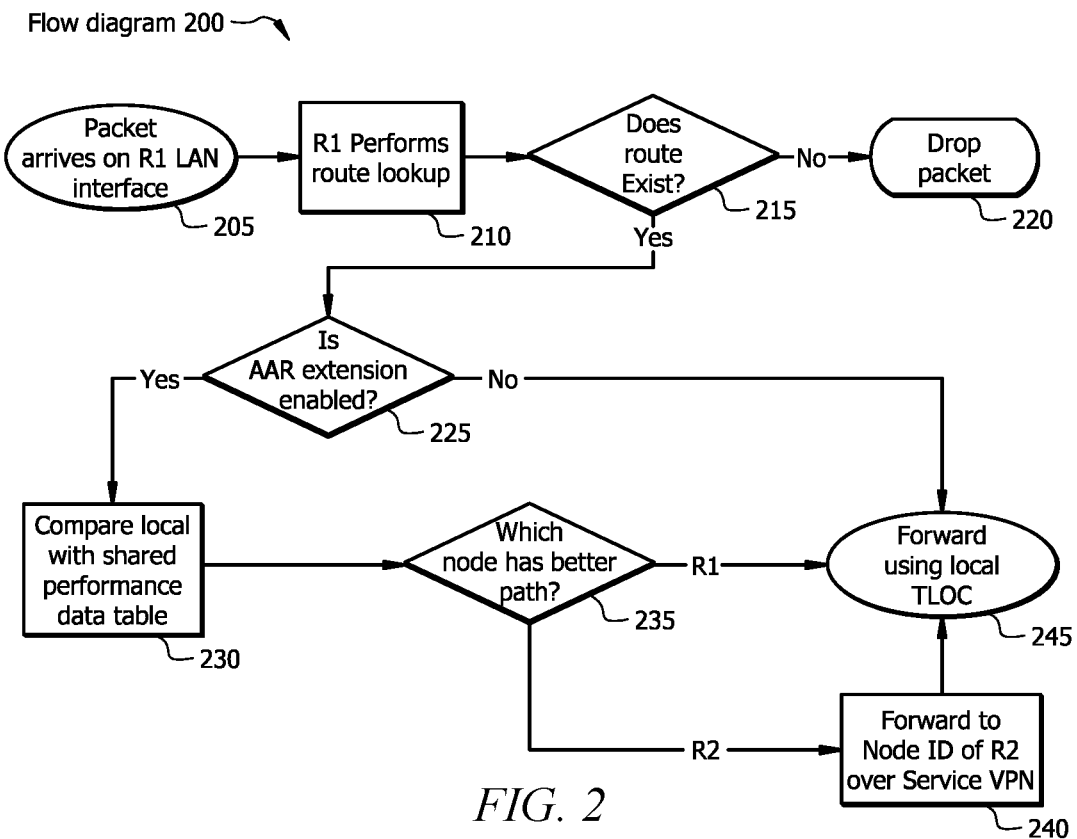
FIG. 2 illustrates an example flow diagram that uses an AAR extension to improve site encryption throughput performance.

FIG. 2 illustrates an example flow diagram 200 that uses an AAR extension to improve site encryption throughput performance. Flow diagram 200 of FIG. 2 may be used by system 100 of FIG. 1. At step 205 of flow diagram 200, a packet arrives on a LAN interface of a first router (R1). For example, referring to FIG. 1, user device 180 may communicate a packet to WAN edge router 120*a* via LAN 110*a*. At step 210 of flow diagram 200, the first router performs a route lookup. For example, WAN edge router 120*a* of FIG. 1 may perform a route lookup by examining the IP header of the received packet, identifying the destination address, and examining the network routes for the best match with the destination address of the IP packet.

At step 215 of flow diagram 200, the first router determines whether a route exists. For example, WAN edge router 120*a* of FIG. 1 may determine, based on the route lookup, whether the network routes in the routing table match with the destination address of the IP packet. If the first router determines that a route does not exist, then flow diagram 200 moves from step 215 to step 220, where the packet is dropped. For example, WAN edge router 120*a* of FIG. 1 may drop the packet if it determines, based on the route lookup, that the network routes in the routing table do not match with the destination address of the IP packet. If, at step 215, the first router determines that a route does exist, then flow diagram 200 advances from step 215 to step 225.

At step 225 of flow diagram 200, the first router determines whether the AAR extension is enabled. For example, WAN edge router 120*a* of FIG. 1 may determine whether it has the ability to share performance data tables 128 and/or DPI flow tables 138 with WAN edge router 120*b*. If the first router determines that the AAR extension is enabled, flow diagram moves from step 225 to step 230, where the first router compares its local performance data table with the performance data table received from the second router. For example, WAN edge router 120*a* of FIG. 1 may compare local performance data from performance data table 128*a* with WAN edge router 120*b*'s performance data from performance data table 128*b*.

At step 235 of flow diagram 200, the first router determines, based on the comparison of the performance data and an application match, whether the first router or the second router has a better path. For example, WAN edge router 120*a* of FIG. 1 may determine whether WAN edge router 120*a* or WAN edge router 120*b* has the better path based on the jitter, packet loss, and or latency of each path and the associated SLA requirements. If the first router determines that the second router has the better path, flow diagram 200 moves from step 235 to step 240, where the first router forwards the packet to the node ID of the second router over a service VPN channel. For example, WAN edge router 120*a* of FIG. 1 may forward the packet to node ID 124*b* of WAN edge router 120*b* over data channel 126*b*. Flow diagram 200 then moves to step 245, where the second router forwards the packet using local TLOC based on its application performance routing table. If, at step 235, the first router determines that the first router has the better path, then flow diagram 200 advances from step 235 to step 245, where the first router forwards the packet using TLOC based its application performance routing table. If, at step 225 of flow diagram 200, the first router determines that AAR extension is not enabled, then the first router forwards the packet using local TLOC based its application performance routing table.

Although this disclosure describes and illustrates particular steps of flow diagram 200 of FIG. 2 as occurring in a particular order, this disclosure contemplates any suitable steps of flow diagram 200 of FIG. 2 occurring in any suitable order. Although this disclosure describes and illustrates an example flow diagram for an AAR extension including the particular steps of the method of FIG. 2, this disclosure contemplates any suitable flow diagram for an AAR extension including any suitable steps, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
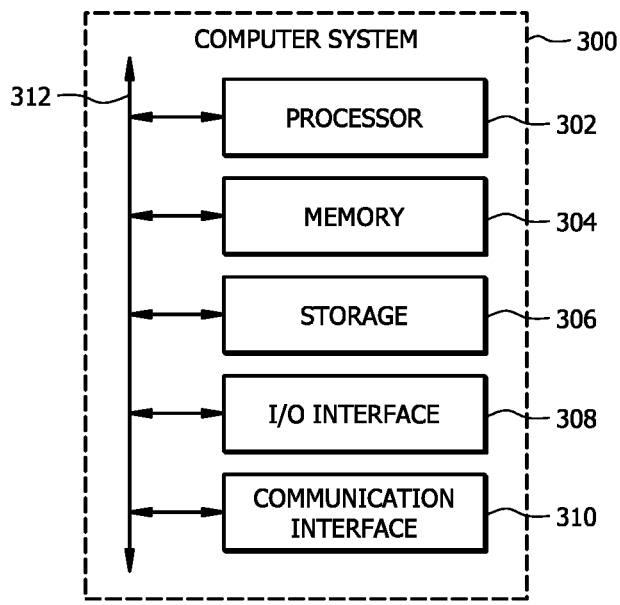
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 404, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or USB drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 406. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network node comprising one or more processors and one or more computer-readable non-transitory storage media coupled to the one or more processors and including instructions that, when executed by the one or more processors, cause the first network node to perform operations comprising:
    defining a service node group, wherein:
        the service node group comprises the first network node and a second network node; and
        the first network node comprises a first performance data table and a first deep packet inspection (DPI) flow table;
    receiving a second performance data table and a second DPI flow table from the second network node;
    comparing the first performance data table and the second performance data table; and
    determining a routing decision for incoming traffic in response to comparing the first performance data table and the second performance data table.

2. The first network node of claim 1, wherein the first network node and the second network node are located at a same branch location.

3. The first network node of claim 1, the operations further comprising assigning a dedicated data logical link per-service virtual private network (VPN) between the first network node and the second network node to forward traffic from the first network node to the second network node.

4. The first network node of claim 1, the operations further comprising:
measuring a transport quality on one or more wide area network (WAN) edge links directly connected to the first network node; and
recording performance data in the first performance data table in response to measuring the transport quality on the one or more WAN edge links.

5. The first network node of claim 1, the operations further comprising generating a control channel between the first network node and the second network node of the service node group using a Network Configuration Protocol (NETCONF).

6. The first network node of claim 1, wherein:
the first performance data table comprises a first unique identifier assigned to the first network node; and
the second performance data table comprises a second unique identifier assigned to the second network node.

7. The first network node of claim 1, wherein:
the first network node and the second network node are wide area network (WAN) edge routers; and
the network is a software-defined wide area network (SD-WAN).

8. A method, comprising:
defining, by a first network node of a network, a service node group, wherein:
the service node group comprises the first network node and a second network node; and
the first network node comprises a first performance data table and a first deep packet inspection (DPI) flow table;
receiving, by the first network node, a second performance data table and a second DPI flow table from the second network node;
comparing, by the first network node, the first performance data table and the second performance data table; and
determining, by the first network node, a routing decision for incoming traffic in response to comparing the first performance data table and the second performance data table.

9. The method of claim 8, wherein the first network node and the second network node are located at a same branch location.

10. The method of claim 8, further comprising assigning, by the first network node, a dedicated data logical link per-service virtual private network (VPN) between the first network node and the second network node to forward traffic from the first network node to the second network node.

11. The method of claim 8, further comprising:
measuring, by the first network node, a transport quality on one or more wide area network (WAN) edge links directly connected to the first network node; and
recording, by the first network node, performance data in the first performance data table in response to measuring the transport quality on the one or more WAN edge links.

12. The method of claim 8, further comprising generating, by the first network node, a control channel between the first network node and the second network node of the service node group using a Network Configuration Protocol (NETCONF).

13. The method of claim 8, wherein:
the first performance data table comprises a first unique identifier assigned to the first network node; and
the second performance data table comprises a second unique identifier assigned to the second network node.

14. The method of claim 8, wherein:
the first network node and the second network node are wide area network (WAN) edge routers; and
the network is a software-defined wide area network (SD-WAN).

15. One or more computer-readable non-transitory storage media embodying instructions that, when executed by a processor, cause the processor to perform operations comprising:
defining a service node group, wherein:
the service node group comprises a first network node and a second network node; and
the first network node comprises a first performance data table and a first deep packet inspection (DPI) flow table;
receiving a second performance data table and a second DPI flow table from the second network node;
comparing the first performance data table and the second performance data table; and
determining a routing decision for incoming traffic in response to comparing the first performance data table and the second performance data table.

16. The one or more computer-readable non-transitory storage media of claim 15, wherein the first network node and the second network node are located at a same branch location.

17. The one or more computer-readable non-transitory storage media of claim 15, the operations further comprising assigning a dedicated data logical link per-service virtual private network (VPN) between the first network node and the second network node to forward traffic from the first network node to the second network node.

18. The one or more computer-readable non-transitory storage media of claim 15, the operations further comprising:
measuring a transport quality on one or more wide area network (WAN) edge links directly connected to the first network node; and
recording performance data in the first performance data table in response to measuring the transport quality on the one or more WAN edge links.

19. The one or more computer-readable non-transitory storage media of claim 15, the operations further comprising generating a control channel between the first network node and the second network node of the service node group using a Network Configuration Protocol (NETCONF).

20. The one or more computer-readable non-transitory storage media of claim 15, wherein:
the first performance data table comprises a first unique identifier assigned to the first network node; and
the second performance data table comprises a second unique identifier assigned to the second network node.

* * * * *